US009340990B2

(12) United States Patent
Bai

(10) Patent No.: US 9,340,990 B2
(45) Date of Patent: May 17, 2016

(54) GUARDRAIL POST

(71) Applicant: GUANGDONG KIN LONG HARDWARE PRODUCTS., LTD, Dongguan (CN)

(72) Inventor: Baokun Bai, Dongguan (CN)

(73) Assignee: Guangdong Kin Long Hardware Products Co., Ltd., Dongguan (CN)

( * ) Notice: Subject to any disclaimer, the term of this patent is extended or adjusted under 35 U.S.C. 154(b) by 0 days.

(21) Appl. No.: 14/866,403

(22) Filed: Sep. 25, 2015

(65) Prior Publication Data

US 2016/0108637 A1 Apr. 21, 2016

(30) Foreign Application Priority Data

Oct. 21, 2014 (CN) .......................... 2014 1 0568020

(51) Int. Cl.

| | |
|---|---|
| ***F16M 11/00*** | (2006.01) |
| ***A47F 5/00*** | (2006.01) |
| ***A47H 1/10*** | (2006.01) |
| ***E04C 3/00*** | (2006.01) |
| ***G09F 17/00*** | (2006.01) |
| ***E04H 12/18*** | (2006.01) |
| ***E04F 11/18*** | (2006.01) |

(52) U.S. Cl.
CPC ................ *E04H 12/18* (2013.01); *E04F 11/18* (2013.01); *G09F 17/00* (2013.01); *G09F 17/0091* (2013.01); *G09F 2017/005* (2013.01)

(58) Field of Classification Search
CPC ......... E04H 12/18; E04F 11/18; G09F 17/00; G09F 17/0091; G09F 2017/005
USPC ............... 116/174, 173; 248/125.8, 326, 161, 248/333; 52/854
See application file for complete search history.

(56) References Cited

U.S. PATENT DOCUMENTS

| | | | | |
|---|---|---|---|---|
| 1,305,885 A * | 6/1919 | Coe | G09F 17/00 | 116/173 |
| 2,977,402 A * | 3/1961 | Parkison | E04H 12/18 | 174/45 R |
| 4,944,656 A * | 7/1990 | Feng | E04H 12/32 | 116/173 |
| 5,076,547 A * | 12/1991 | Osterholm | E04F 11/18 | 256/67 |
| 5,363,607 A * | 11/1994 | Turturro | E04H 12/32 | 116/173 |
| 6,018,926 A * | 2/2000 | Chen-Chao | E04H 12/32 | 116/63 R |
| 6,923,141 B1 * | 8/2005 | Staats | G09F 17/00 | 116/173 |
| 7,905,677 B1 * | 3/2011 | Erickson | E04H 12/08 | 248/529 |

(Continued)

*Primary Examiner* — Brian Glessner
*Assistant Examiner* — Omar Hijaz
(74) *Attorney, Agent, or Firm* — Kagan Binder, PLLC

(57) ABSTRACT

A guardrail post includes a post body, a first sleeve secured to the post body, a locking mechanism, a second sleeve, a slider, a first fastener, a limiting seal cover, and a first hanging rod. The locking mechanism includes a locking tube, a locking sleeve, and four clamping pieces. The second sleeve extends into the locking sleeve. The slider slidably is received in the second sleeve. The limiting seal cover is positioned on the second sleeve. The first hanging rod extends into the limiting seal cover. The locking tube extends into the first sleeve and defines four first through holes, the locking sleeve is sleeved on the locking tube. The four clamping pieces are respectively positioned in the four first through holes, the locking sleeve resists the four clamping pieces inwardly. The first fastener rotatably connects the locking tube with the first hanging rod.

20 Claims, 9 Drawing Sheets

(56) References Cited

U.S. PATENT DOCUMENTS

| | | | | |
|---|---|---|---|---|
| 8,297,216 | B1 * | 10/2012 | Janton | G09F 17/00 116/173 |
| 8,499,712 | B2 * | 8/2013 | Jakobsson | G09F 17/00 116/173 |
| 8,695,252 | B2 * | 4/2014 | Urbina | G09F 17/00 116/173 |
| 2003/0010274 | A1 * | 1/2003 | McCudden | G09F 17/00 116/173 |
| 2003/0084835 | A1 * | 5/2003 | Chao | G09F 17/00 116/173 |
| 2007/0145202 | A1 * | 6/2007 | Hsieh | F16B 7/1427 248/161 |
| 2011/0290171 | A1 * | 12/2011 | Brick | E04H 12/2238 116/173 |
| 2013/0042800 | A1 * | 2/2013 | Chen | G09F 17/00 116/173 |
| 2013/0185971 | A1 * | 7/2013 | Mandl et al. | G09F 7/20 40/606.15 |
| 2014/0339383 | A1 * | 11/2014 | Lowe et al. | F16M 11/28 248/161 |
| 2015/0359114 | A1 * | 12/2015 | Yang | H05K 5/0204 248/161 |

* cited by examiner

GUARDRAIL POST

CROSS REFERENCE TO RELATED APPLICATIONS

This application claims priority under 35 U.S.C. §119(b) and 37 CFR 1.55 to Chinese application filed on Oct. 21, 2014, and having serial number 201410568020.9, wherein the entirety of said application is incorporated herein by reference.

FIELD OF THE INVENTION

The present disclosure relates to a technical field of guardrail, and more particularly, relates to a guardrail post.

BACKGROUND OF THE INVENTION

The guardrail post is mainly applied to opposite ends of a guardrail, and used to provide a supporting function. At present, a general guardrail post has a unitary function, and has no other additional functions. If the guardrail post in the central business district is desired to hang a flag or a poster, in conventional practice, a hanging rod is binding to or welded to the guardrail post, and configured to hang the flag or the poster, etc. However, the adopted binding manner causes a certain extent of damage to the guardrail post. If the welding way is adopted, when the flag or the poster is not required to be hung, the hanging rod is left on the guardrail post, affecting the overall impression of guardrail to user.

SUMMARY OF THE INVENTION

Therefore, it is necessary to provide a guardrail post with multiple functions.

A guardrail post includes a post body, a first sleeve secured to the post body, a blocking mechanism, a second sleeve, a slider, a first fastener, a limiting seal cover, and a first hanging rod. The locking mechanism includes a locking tube having an end extending inside the first sleeve, a plurality of clamping pieces, and a locking sleeve. The locking tube defines a plurality of spaced arranged first through holes at the other end thereof along a peripheral sidewall. The plurality of clamping pieces is positioned in the plurality of first through holes, respectively. The locking sleeve is sleeved on the locking tube and has an inner sidewall defining an inclined surface, the inner sidewall engages with the plurality of clamping pieces. The second sleeve has a bottom end extending inside the locking sleeve, the second sleeve defines a first notch extending along an axial direction at a top end thereof. The slider is slidably received in the second sleeve, a top end of the slider forms two protrusion plates spaced from each other, each protrusion plate defines a second through hole. The limiting seal cover is positioned on the top end of the second sleeve, the limiting seal cover defines a second notch along an axial direction at a top end, the limiting seal cover forms a blocking wall protruding inwardly along a radial direction at the top end. The first hanging rod extends inside the limiting seal cover, the first hanging rod defines a third through hole at an end. Wherein the first fastener extends through the third through hole, and opposite ends of the first fastener extends inside the two second through holes, respectively.

A guardrail post includes a post body, a first sleeve secured to the post body, a locking mechanism, a second sleeve, a slider, a limiting seal cover, a first hanging rod, a first fastener, a latching member, and a second hanging rod. The locking mechanism includes a locking tube extending inside the first sleeve and defining a plurality of first through holes along a peripheral sidewall, a locking sleeve sleeved on the locking tube, and a plurality of clamping pieces positioned in the plurality of first through holes, respectively, the locking sleeve resists the plurality of clamping pieces inwardly. The second sleeve extends inside the locking sleeve and defines a first notch extending along an axial direction. The slider is slidably received in the second sleeve and forms two protrusion plates spaced from each other, each protrusion plate defines a second through hole. The limiting seal cover is positioned on the second sleeve and defines a second notch along an axial direction, and forms a blocking wall protruding inwardly along a radial direction. The first hanging rod extends inside the limiting seal cover, the first hanging rod defines a third through hole at an end. The first fastener extends through the third through hole, and opposite ends of the first fastener extends into the two second through holes respectively. The latching member is secured to the first sleeve. The second hanging rod is rotatably connected to the first sleeve and detachably latched by the latching member.

These and other aspects and features of the disclosure will be better understood upon reading the following detailed description when taken into conjunction with the accompanying drawings.

BRIEF DESCRIPTION OF THE DRAWINGS

These and other features of the present invention will become readily apparent upon further review of the following specification and drawings. In the drawings, like reference numerals designate corresponding parts throughout the views. Moreover, components in the drawings are not necessarily drawn to scale, the emphasis instead being placed upon clearly illustrating the principles of the present disclosure.

Figure 1:
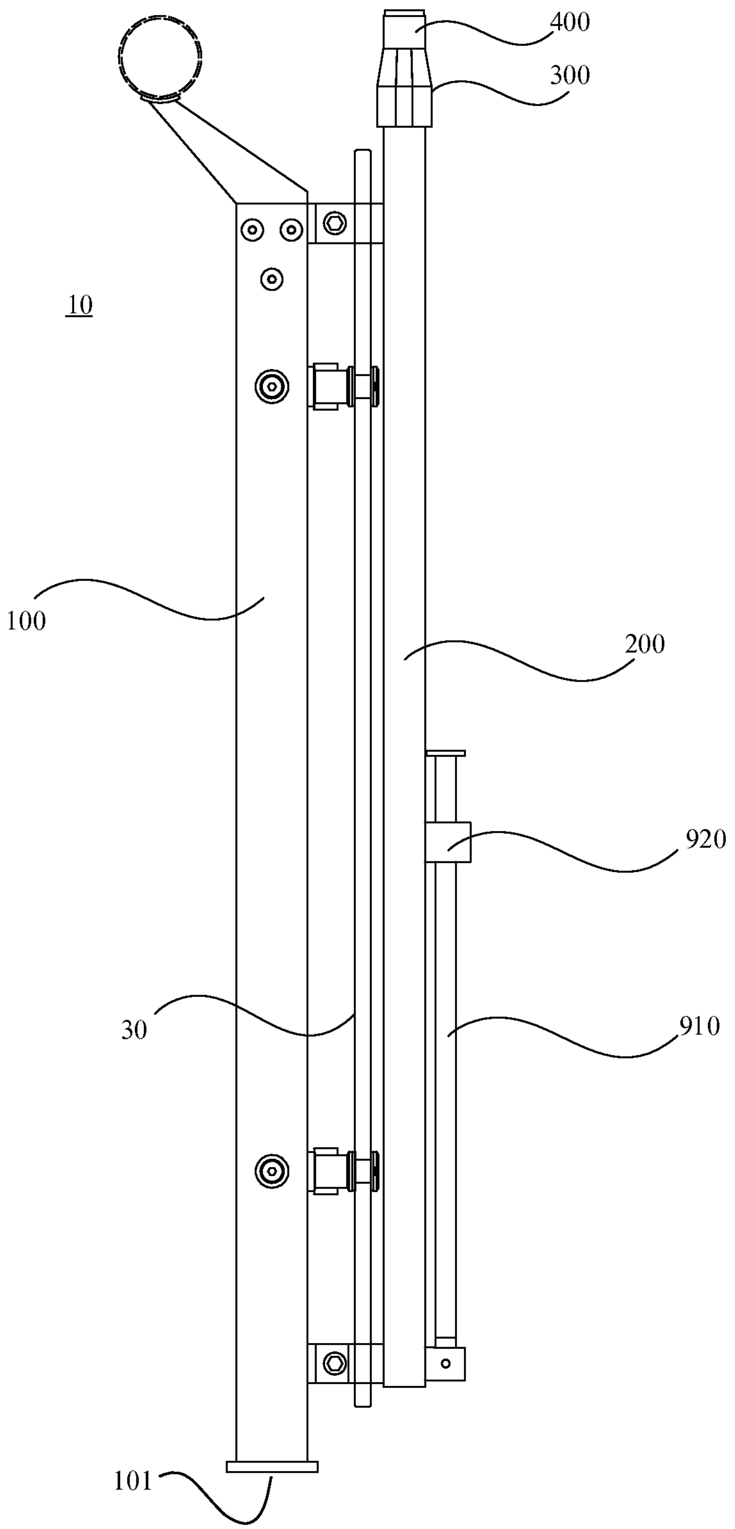
FIG. 1 is a schematic view of a guardrail post in a default state according to a first embodiment.

While the present disclosure is susceptible to various modifications and alternative constructions, certain illustrative embodiments thereof have been shown in the drawings and will be described below in detail. It should be understood, however, that there is no intention to limit the present invention to the specific forms disclosed, but on the contrary, the intention is to cover all modifications, alternative constructions and equivalents falling within the spirit and scope of the present disclosure.

DETAILED DESCRIPTION OF THE EMBODIMENTS

Embodiments of the invention are described more fully hereinafter with reference to the accompanying drawings.

The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 through FIG. 9 are schematic views of a guardrail post 10 according to a first embodiment. The guardrail post 10 is configured to hang an object such as a flag 20 or a poster. The guardrail post 10 includes a post body 100, a first sleeve 200, a locking mechanism 300, a second sleeve 400, a slider 500, a first fastener 610, a limit seal cover 620, a hanging rod 700, an adapting sleeve 810, a second fastener 820, a second handing rod 910, and a latching member 920.

Figure 2:
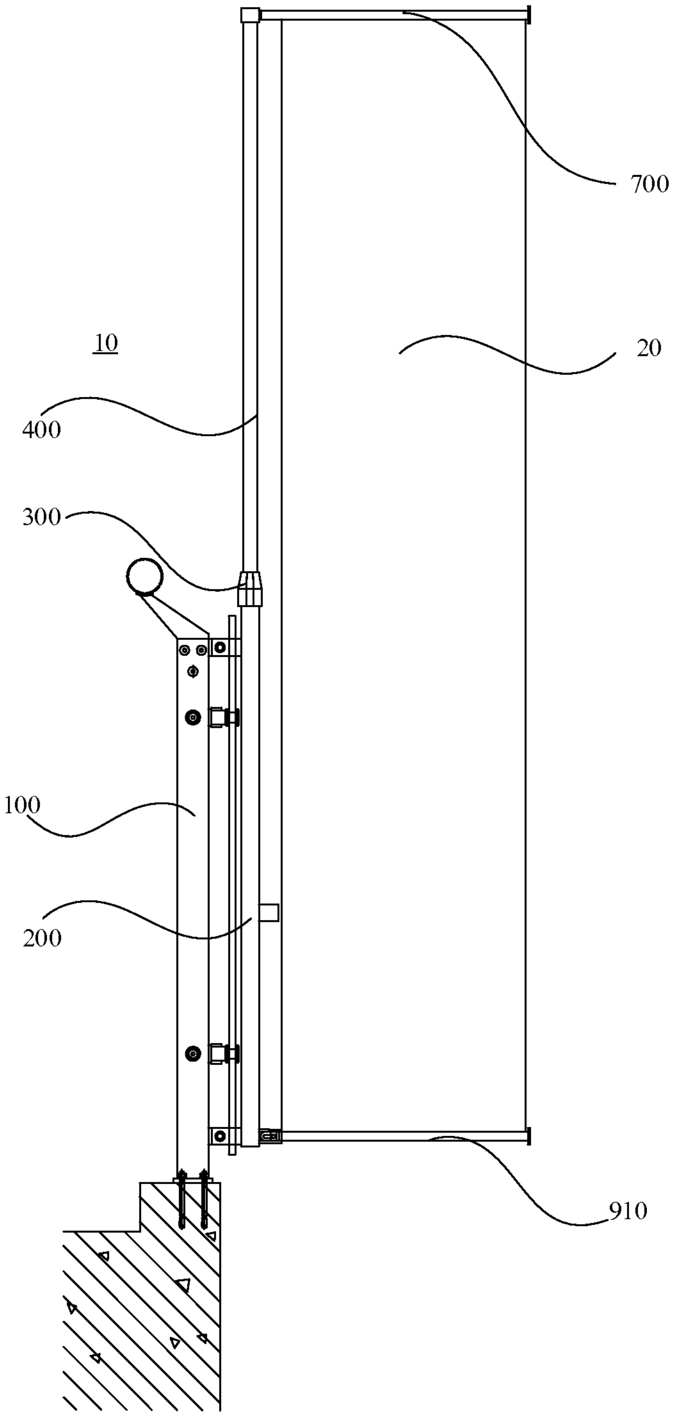
FIG. 2 is a schematic view of the guardrail post of FIG. 1, when hanging a flag.
Figure 3:
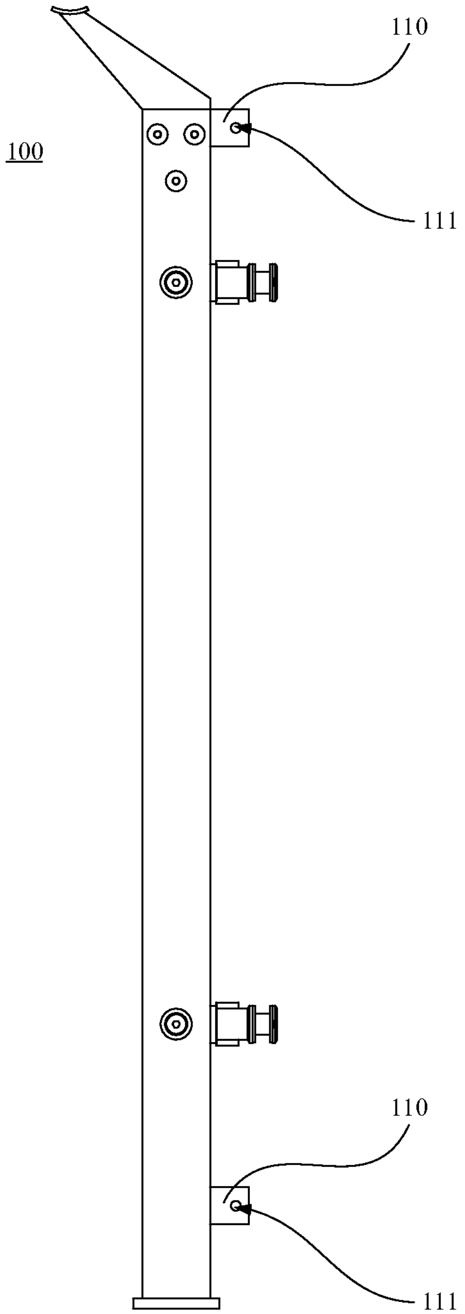
FIG. 3 is a schematic view of a post body of the guardrail post of FIG. 1.

Referring to FIG. 2 and FIG. 3, the post body 100 can be a circular sleeve, a square sleeve, or in a tabular shape. The post body 100 defines a fixing hole 101 at a bottom. A fastener such as a screw may extend through the fixing hole 101 to secure the post body 100 to an external object (ground, for example). The post body 100 may be provided with a connecting claw or a glass clamp, which is configured to clamp and support glass 30 (see FIG. 1). The post body 100 is further provided with at least two first convex lugs 110 at opposite ends. The first convex lug 10 defines a first positioning hole 111. Specifically, the first convex lug 110 is positioned on a side surface of the post body 100, the at least two convex lugs 110 is spaced from each other.

Figure 4:
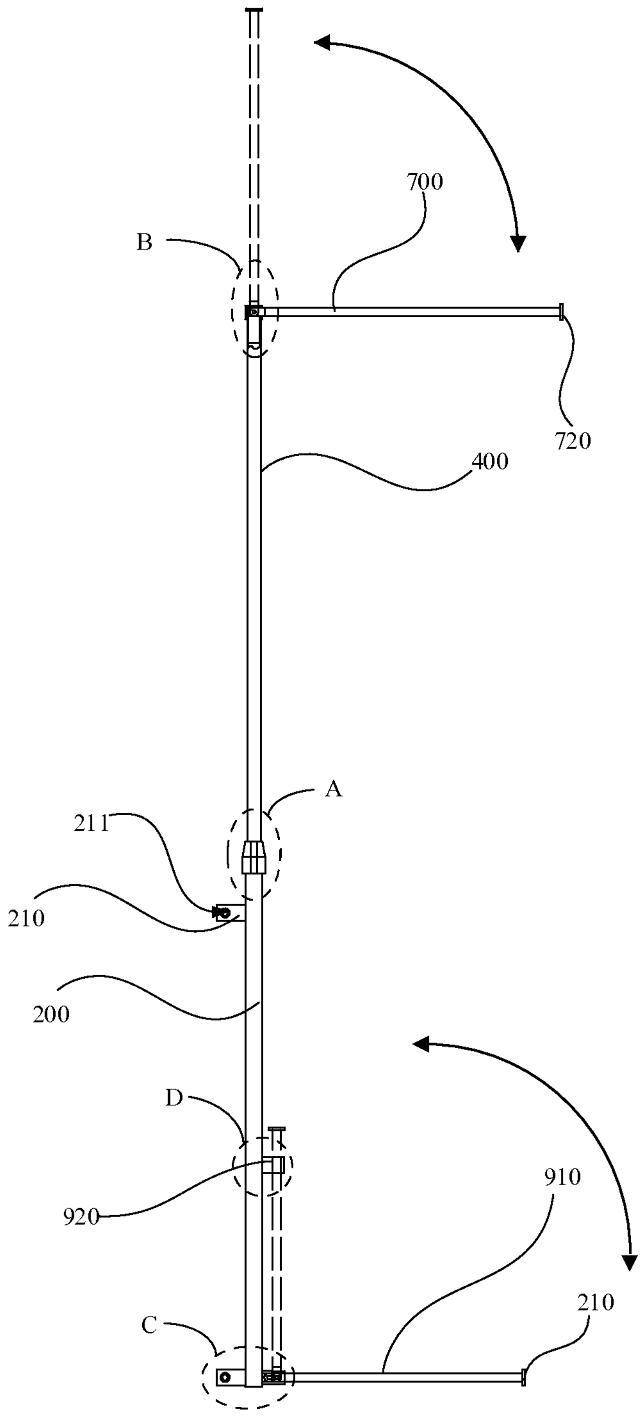
FIG. 4 is a expanded view of the guardrail post of FIG. 1.

Also referring to FIG. 4, the first sleeve 200 is fixed to the post body 100, the first sleeve 200 is in a hollow tubular shape. Specifically, the first sleeve 200 is provided with at least two second convex lugs 210 at oppose ends. The second convex lug 210 defines a second positioning hole 211. A third fastener (not shown) extends through the first positioning hole 111 and the second positioning hole 211, to secure the first sleeve 200 to the post body 100. The third fastener can be fastener such as a screw or a pin. Obviously, in other embodiment, the first sleeve 200 can be secured to the post body 100 via adhesive.

Figure 5:
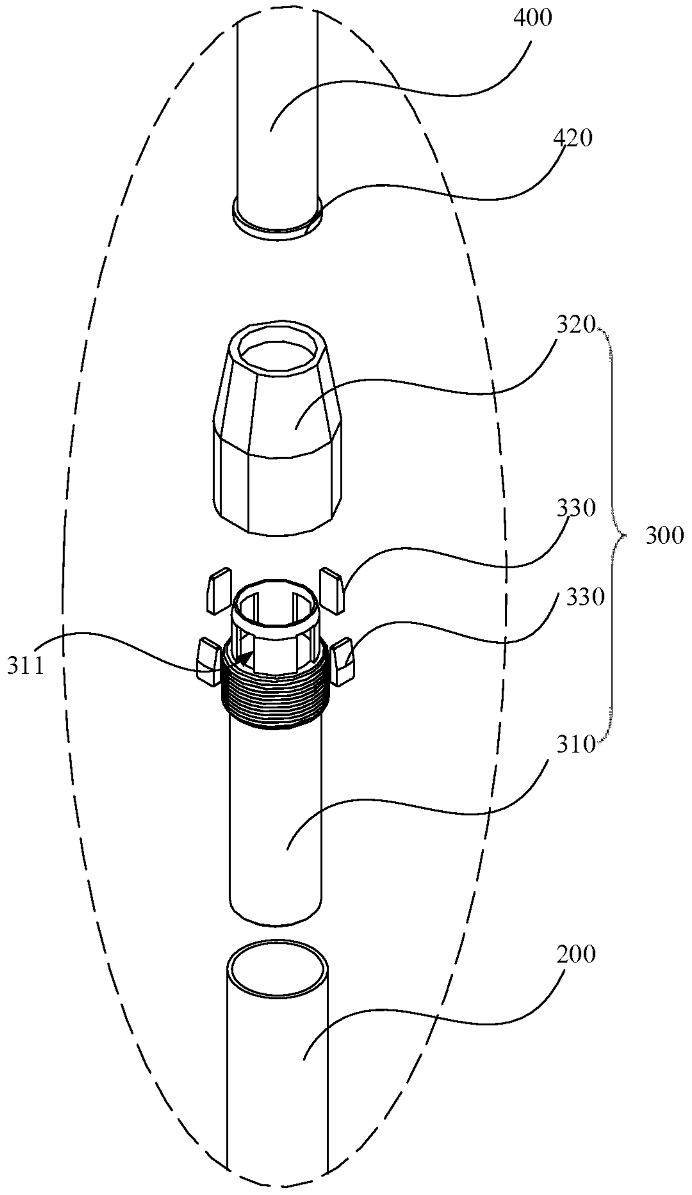
FIG. 5 is an enlarged view of circled portion A of the guardrail post of FIG. 4.
Figure 6:
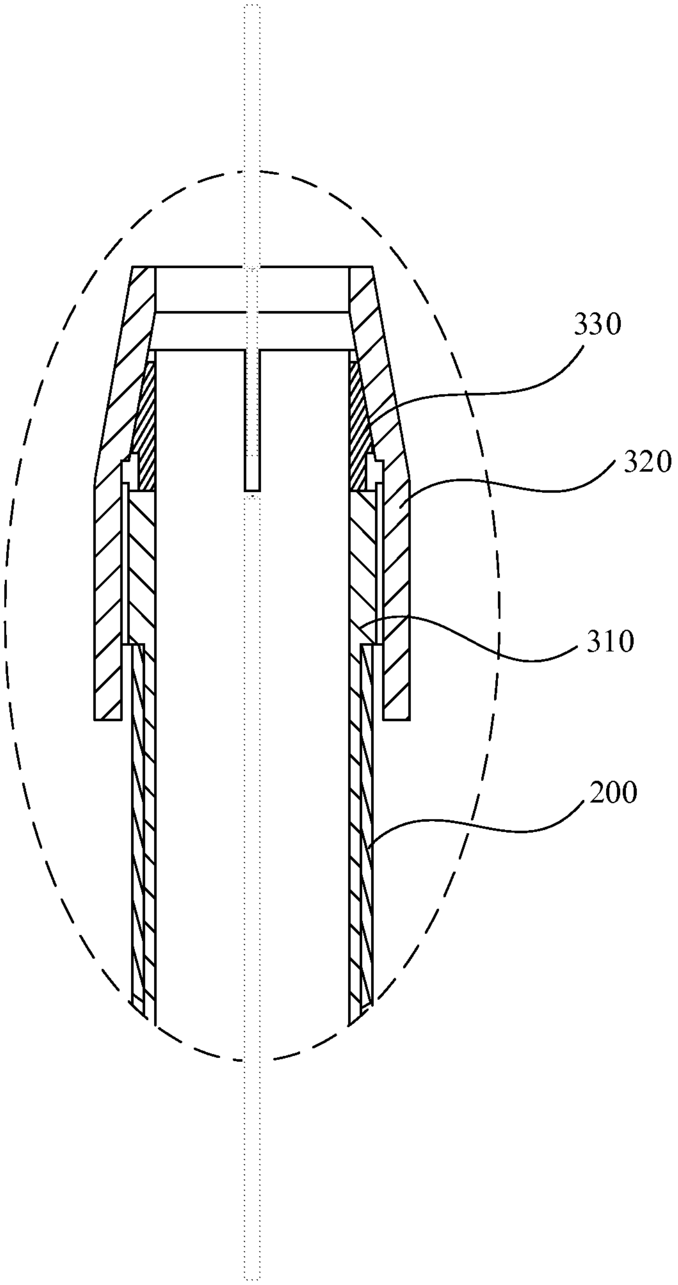
FIG. 6 is a cross-sectional view of circled portion A of the guardrail post of FIG. 4.
Figure 7:
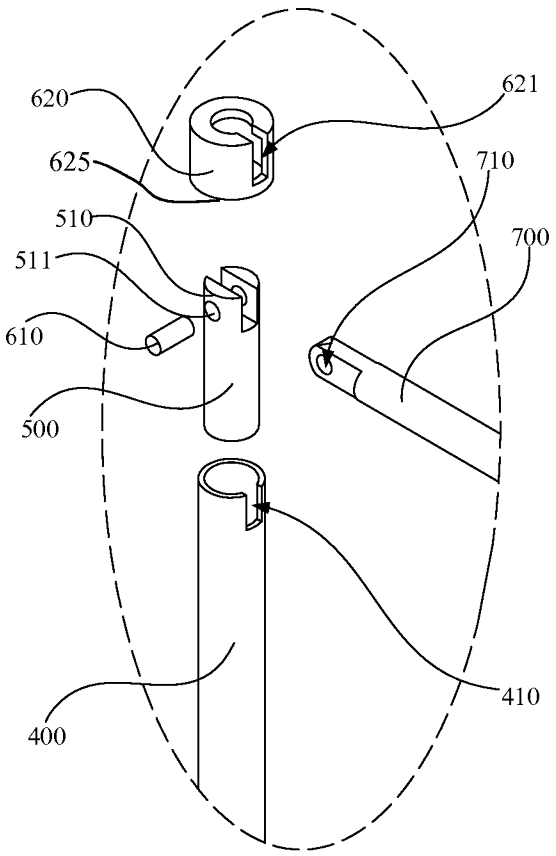
FIG. 7 is an enlarged, exploded view of circled portion B of the guardrail post of FIG. 4.

Referring to FIG. 5 and FIG. 6, the locking mechanism 300 includes a locking tube 310, a locking sleeve 320, and a plurality of clamping pieces 330. An end of the locking tube 310 extends into the first sleeve 200, the other end of the locking tube 310 defines a plurality of first through holes 311 along a periphery walls thereof. The plurality of first through holes 311 is spaced from each other. Specifically, the number of the first through holes 311 can be four. The plurality of clamping pieces 330 are positioned in the plurality of first through holes 311, respectively. Specifically, the number of the clamping pieces 330 can be four. An end of the clamping piece 330 can be formed integrally with the locking tube 310. The clamping piece 330 extends into an inner of the locking tube 310 via the first through hole 311. The locking sleeve 320 is in a hollow tubular structure, the locking sleeve 320 is sleeved on the locking tube 310, and an inner sidewall of the locking sleeve 320 defines an inclined surface, causing the locking sleeve 320 to be a frustum of a pyramid structure which has an end with a greater diameter and another end with a less diameter. The plurality of inner sidewalls of the locking sleeve 320 resists the plurality of clamping pieces 330, respectively.

A middle portion of the locking tube 310 is provided with a plurality of external threads, the locking sleeve 320 is provided with a plurality of internal threads engaging with the external threads. The locking sleeve 320 and the locking tube 310 engages with each other via the external threads and the internal threads. When the second sleeve 400 is secured to the first sleeve 200, the locking sleeve 320 is rotated, causing the locking sleeve 320 to rotate along a direction adjacent to the first sleeve 200. Because the inner sidewall of the locking sleeve 320 includes the inclined surface, the locking sleeve 320 is a frustum of a pyramid structure which has an end with a greater diameter and another end with a less diameter, thus accompanying to the screwing in of the locking sleeve 320, the inner sidewall of the locking sleeve 320 compresses the clamping pieces 330, allowing the clamping pieces 330 to extend into the inner of the locking sleeve 320. The distances between the clamping pieces 330 are decreased, the clamping piece 330 resists the second sleeve 400 which extends into the inner of the locking sleeve 320. The clamping pieces 330 compress the second sleeve 400 to secure the second sleeve 400 to the first sleeve 200. When the second sleeve 400 is required to extend out of or retract into the first sleeve 20, the locking sleeve 320 is rotated along a reverse direction, terminating the compression of the locking sleeve 320 to the clamping pieces 330, and then the stress exerted on the second sleeve 400 by the clamping pieces 330 is released. By the time, the second sleeve 400 is movable relative to the first sleeve 200.

Obviously, in other embodiment, the first sleeve and the second sleeve may define a positioning hole, and then the a resilient clip can be provided to realizing the extending out or retracting of the second sleeve relative the first sleeve. The resilient clip includes a resilient portion and a protrusion, the resilient portion is received within the second sleeve, and the protrusion protrudes from the resilient portion. The protrusion extends through the positioning hole of the first sleeve and the positioning sleeve of the second sleeve sequentially. When the second sleeve is required to move relative to the first sleeve, the protrusion is pressed to retract within the first sleeve, and then the second sleeve is moved up and down. When the protrusion is moved and aligned to the positioning hole of the first sleeve, the protrusion extends into the positioning hole, by the time, the first sleeve is secured to the second sleeve.

A bottom end of the second sleeve 400 extends into the locking sleeve 320, an external diameter of the second sleeve 400 is less or equal to an internal diameter of the first sleeve 200, to enable the second sleeve 400 to extend out or retract into the first sleeve 200. The second sleeve 400 has a hollow tubular structure. The end portion of the second sleeve 400 extending inside the locking sleeve 320 protrudes along a periphery to form a first protrusion 420. The first protrusion 420 resists an inner sidewall of the locking sleeve 320, to prevent the second sleeve 400 from slipping from the first sleeve 200. Also referring to FIG. 7, a top end of the second sleeve 400 defines a first notch 410 extending along an axial direction of the second sleeve 400.

The slider 500 is slidably received within the second sleeve 400. An external diameter of the slider 500 is less than or equal to an internal diameter of the second sleeve 400. A top of the slider 500 forms two protruding plates 510 opposite to each other. Each protruding plate 510 define a second through hole 511. Specifically, the first fastener 610 can be a pin. Obviously, in other embodiment, the first fastener 610 can also be fasteners such as a screw. The limiting seal cover 620 is positioned on the top end of the second sleeve 400.

The limiting seal cover 620 defines a second notch 621 extending along an axial direction of the limiting seal cover 620 at a top portion. The limiting seal cover 620 forms a blocking wall 625 protruding inwardly along a radial direction of the limiting seal cover 620.

The first hanging rod 700 is positioned in the limiting seal cover 620. The first hanging rod 700 defines a third through hole 710 at a bottom end. The third through hole 710 is circular. The first fastener 610 extends though the third through hole 710, and opposite ends of the first fastener 610 extend into the second through holes 511. The end portion of the first hanging rod 700 defining the third through hole 710 is in an arc shape. Opening widths of the first notch 410 and the second notch 621 are greater or equal to a diameter of the end portion of the first hanging rod 700 defining the third through hole 710. As shown in FIG. 4, the first hanging rod 700 forms a second protrusion 720 protruding from a periphery of the top end of the first hanging rod 700. When the first handing rod 700 is retracted into the second sleeve 400, the second protrusion 720 can resist the limiting seal cover 620, to prevent the first hanging rod 700 from entirely retracting into the second sleeve 400.

Referring to FIG. 2, when it is not desired to hang an object such as a flag, the first hanging rod 700 is pulled outward and rotated upward, and then the first hanging rod 700 retracts into the second sleeve 400, the final state is shown as FIG. 1. Referring to FIG. 1, when an object such as a flag is desired to be hung, the first hanging rod 700 is pulled from the second sleeve 400 and rotated downward. The first hanging rod 700 is aligned along a horizontal direction. By the time, the first hanging rod 700 extends into the limiting seal cover 620, causing the bottom end of the first hanging rod 700 to resists the blocking wall 625 of the limiting seal cover 620, thus the flag can be hung, the final state is shown as FIG. 2.

Figure 8:
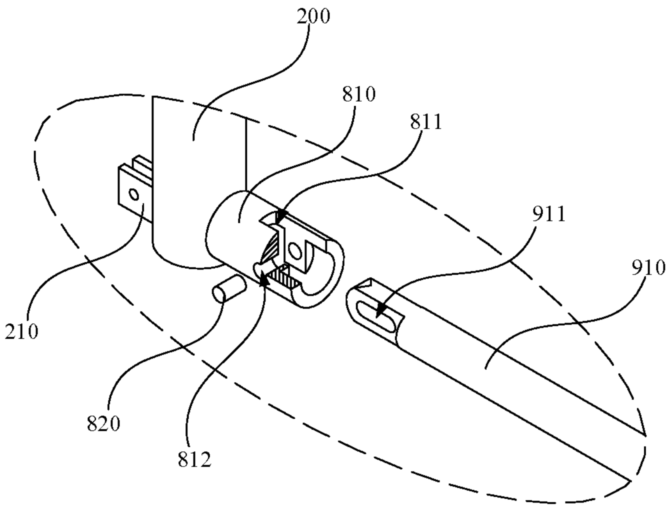
FIG. 8 is an enlarged, exploded view of circled portion C of the guardrail post of FIG. 4.
Figure 9:
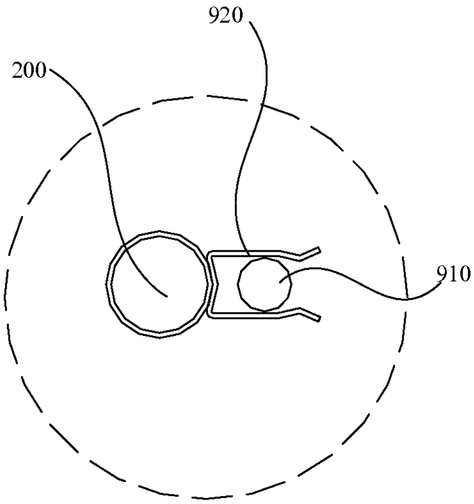
FIG. 9 is a top view of circled portion D of the guardrail post of FIG. 4.

Also referring to FIG. 8 and FIG. 9, an end of the adapting sleeve 810 is fixed to the first sleeve 200. The adapting sleeve 810 defines a third notch 811 extending along an axial direction of the adapting sleeve 810. Sidewalls of the adapting sleeve 810 further define two fifth through holes 812, the two fifth through hole 812 are respectively positioned on opposite sides of the third notch 811. The second hanging rod 910 defines a fourth through hole 911 at an end, the fourth through hole 911 is a slotted hole. Opening width of the third notch 811 is greater or equal to a diameter of an end portion of the second hanging rod 910 which defines the fourth through hole 911. The second fastener 820 extends through the fourth through hole 911, and opposite ends of the second fastener 820 respectively extends into the fifth through holes 812. Specifically, the second fastener 820 can be a pin. Obviously, in other embodiment, the first fastener 610 can also be fasteners such as a screw.

As shown in FIG. 4 and FIG. 9, the latching member 920 is positioned on the first sleeve 200, and configured to clamp the second hanging rod 910. When it is not desired to hang an object such as a flag, the second hanging rod 910 is pulled outward and rotated upward, and then the second hanging rod 910 is pressed into the latching member 920. When an object such as a flag is desired to be hung, the second hanging rod 910 is pulled from the latching member 820 and rotated downward. The second hanging rod 910 is aligned along a horizontal direction. By the time, the second hanging rod 910 extends into the adapting sleeve 810, to enable the end portion of the second hanging rod 910 to resist the inner sidewall of the adapting sleeve 810, therefore, the object such as a flag can be hung.

After above described guardrail post 10 is assembled, when the object such as the flag 20 is required to be hung, the second sleeve 400 extends out of the first sleeve 200 for a distance, the locking sleeve 320 is rotated to compress the clamping pieces 330, to allow the clamping pieces 330 to resist the second sleeve 400. By the time, the second sleeve 400 is fixedly relative to the first sleeve 200. The first hanging rod 700 extends out of the second sleeve 400, the slider 500 moves upward accompanying to the movement of the first hanging rod 700. When the top of the slider 500 resists the blocking wall 625 of the limiting seal cover 620, the slider 500 is unable to continue to move upward, by the time, the first notch 410 and the second notch 621 are aligned to the space between the two protruding plate 510, the first hanging rod 700 is rotated and aligned along the horizontal direction, the end portion of the first hanging rod 700 which defines the third through hole 710 resists the blocking wall 625 of the limiting seal cover 620, the object such as the flag can be hung. When the object such as the flag is no desired to be hung, the first hanging rod 700 is rotated and aligned along a vertical direction. The first hanging rod 700 is moved downwardly and retracted into the second sleeve 400. The second sleeve 400 is moved downwardly and retracted into the first sleeve 200. The first hanging rod 700 and the second sleeve 400 can be retracted and hidden in the first sleeve 200.

Figure 10:
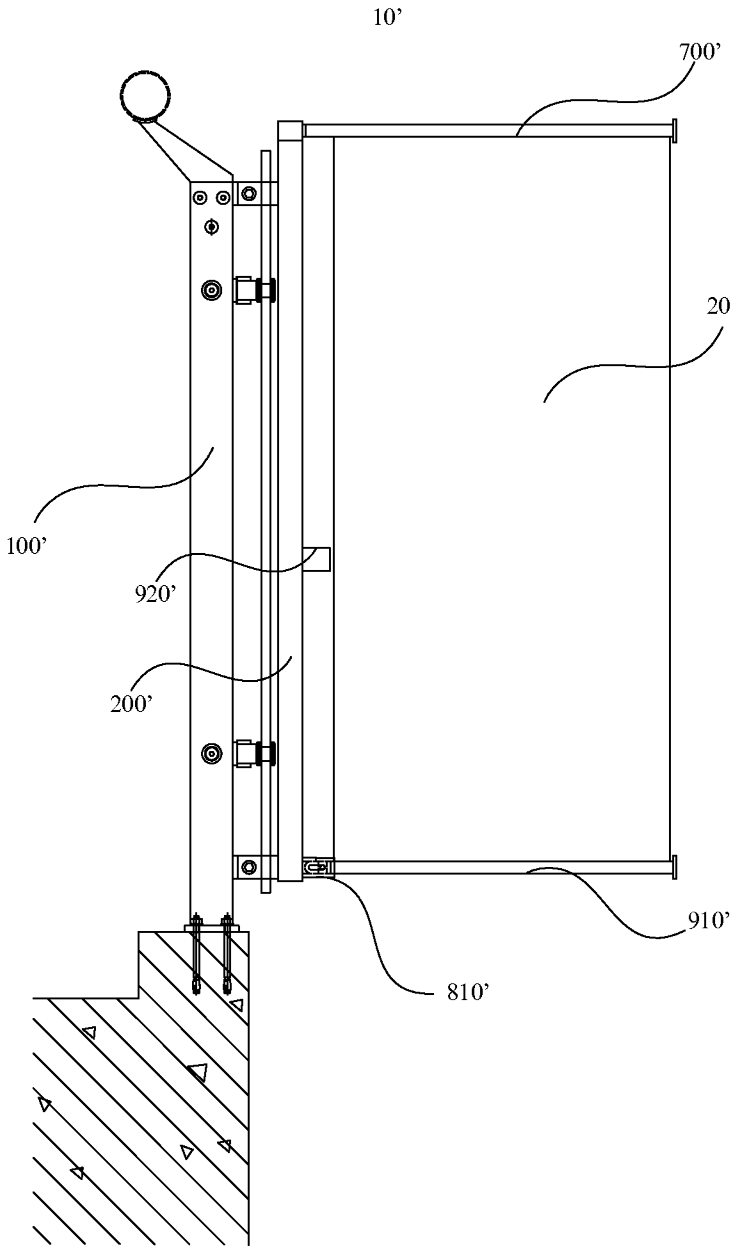
FIG. 10 is a schematic view of a guardrail post according to a second embodiment.

Referring to FIG. 10, it shows a guardrail post 10' according to a second embodiment. The guardrail post 10' includes a post body 100', a first sleeve 200', a slider (not shown), a first fastener (not shown), a limiting seal cover (not shown), a first hanging rod 700', an adopting sleeve 810', a second fastener (not shown), a second hanging rod 910' and a latching member 920'. In the embodiment, the second sleeve and the locking mechanism are omitted, and thus the first hanging rod is directly positioned on a top of the first sleeve. Accordingly, a first notch is defined on the top end of the first sleeve. The connection relationships between the other components are same as that of the first embodiment, and are not specifically described.

After above described guardrail post 10 is assembled, when the object such as the flag 20 is required to be hung, the first hanging rod 700' extends out of the first sleeve 200', the slider (not shown) moves upward accompanying to the movement of the first hanging rod 700'. When the top of the slider resists the blocking wall of the limiting seal cover (not shown), the slider is unable to continue to move upward, by the time, the first notch and the second notch are aligned to the space between the two protruding plate, the first hanging rod 700' is rotated and aligned along the horizontal direction, the end portion of the first hanging rod 700' defining the third through hole 710 resists the blocking wall of the limiting seal cover, the object such as the flag can be hung. When the object such as the flag 20 is not desired to be hung, the first hanging rod 700' is rotated and aligned along a vertical direction. The first hanging rod 700' is moved downwardly and retracted into the first sleeve. The first hanging rod 700' can be retracted and hidden in the first sleeve.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A guardrail post, comprising:
- a post body;
- a first sleeve secured to the post body;
- a locking mechanism, comprising:
  - a locking tube having an end extending inside the first sleeve, the locking tube defining a plurality of spaced arranged first through holes at the other end thereof along a peripheral sidewall;
  - a plurality of clamping pieces positioned in the plurality of first through holes, respectively, and
  - a locking sleeve sleeved on the locking tube and having an inner sidewall defining an inclined surface, the inner sidewall engaging with the plurality of clamping pieces;
- a second sleeve having a bottom end extending inside the locking sleeve, the second sleeve defining a first notch extending along an axial direction at a top end thereof;
- a slider slidably received in the second sleeve, a top end of the slider forming two protrusion plates spaced from each other, each protrusion plate defining a second through hole;
- a first fastener;
- a limiting seal cover positioned on the top end of the second sleeve, the limiting seal cover defining a second notch along an axial direction at a top end, the limiting seal cover forming a blocking wall protruding inwardly along a radial direction at the top end; and
- a first hanging rod extending inside the limiting seal cover, the first hanging rod defining a third through hole at an end;
- wherein the first fastener extends through the third through hole, and opposite ends of the first fastener extends inside the two second through holes, respectively.

2. The guardrail post according to claim 1, wherein a middle portion of the locking tube is provided with a plurality of external threads, the locking sleeve is provided with a plurality of internal threads engaging with the external threads.

3. The guardrail post according to claim 1, wherein an end portion of the second sleeve which extends into the locking sleeve forms a first protrusion protruding outwardly along a radial direction, the first protrusion resists the inner sidewall of the locking sleeve.

4. The guardrail post according to claim 1, wherein a top portion of the first hanging rod forms a second protrusion protruding outwardly along a radial direction, the second protrusion resists the limiting seal cover.

5. The guardrail post according to claim 1, further comprising:
- an adapting sleeve with an end secured to the first sleeve, the adapting sleeve defining a third notch extending along an axial direction, and two fifth through hole at a sidewall, the two fifth through hole being positioned opposite sides of the third notch;
- a second fastener; and
- a second hanging rod with an end defining a fourth through hole;
- wherein the second fastener extends into the fourth through hole, and opposite ends of the second fastener extends into the fifth through holes, respectively.

6. The guardrail post according to claim 5, further comprising a latching member, wherein the latching member is positioned on the first sleeve, configured to latching with the second hanging rod.

7. The guardrail post according to claim 1, further comprising a third fastener, wherein the post body is provided with at least two first convex lugs, each first convex lug defines a first positioning hole, the first sleeve is provided with at least two second convex lugs, each second convex lug defines a second positioning hole, the third fastener extends through the first positioning hole and the second positioning hole.

8. The guardrail post according to claim 1, wherein the post body defines a fixing hole at a bottom thereof, the guardrail post further comprise a fastener extending inside the fixing hole thereby securing the post body to an external object.

9. The guardrail post according to claim 1, wherein the post body is further provided with a connection claw or glass clamp configured to clamp and support glass.

10. The guardrail post according to claim 1, wherein the first fastener is a pin.

11. A guardrail post, comprising:
- a post body;
- a first sleeve secured to the post body;
- a locking mechanism, comprising:
  - a locking tube extending inside the first sleeve and defining a plurality of first through holes along a peripheral sidewall;
  - a locking sleeve sleeved on the locking tube; and
  - a plurality of clamping pieces positioned in the plurality of first through holes, respectively, the locking sleeve resisting the plurality of clamping pieces inwardly;
- a second sleeve extending inside the locking sleeve and defining a first notch extending along an axial direction;
- a slider slidably received in the second sleeve and forming two protrusion plates spaced from each other, each protrusion plate defining a second through hole;
- a limiting seal cover positioned on the second sleeve and defining a second notch along an axial direction, and forming a blocking wall protruding inwardly along a radial direction;
- a first hanging rod extending inside the limiting seal cover, the first hanging rod defining a third through hole at an end;
- a first fastener extending through the third through hole, and opposite ends of the first fastener extending inside the two second through holes respectively;
- a latching member secured to the first sleeve; and
- a second hanging rod rotatably connected to the first sleeve and detachably latched by the latching member.

12. The guardrail post according to claim 11, wherein a middle portion of the locking tube is provided with a plurality of external threads, the locking sleeve is provided with a plurality of internal threads engaging with the external threads.

13. The guardrail post according to claim 11, wherein an end portion of the second sleeve extends into the locking sleeve and forms a first protrusion protruding outwardly along a radial direction, the first protrusion resists an inner sidewall of the locking sleeve.

14. The guardrail post according to claim 11, wherein a top portion of the first hanging rod forms a second protrusion protruding outwardly along a radial direction, the second protrusion resists the limiting seal cover.

15. The guardrail post according to claim 11, further comprising:

an adapting sleeve with an end secured to the first sleeve, the adapting sleeve defining a third notch extending along an axial direction, and two fifth through holes at a sidewall, the two fifth through hole being positioned opposite sides of the third notch; and a second fastener;

wherein the second sleeve has an end defining a fourth through hole, the second fastener extends through the fourth through hole, and opposite ends of the second fastener extends inside the fifth through holes respectively.

16. The guardrail post according to claim 11, wherein an inner sidewall of the locking sleeve defines an inclined surface, the inclined surface of the locking sleeve resists the plurality of clamping pieces inwardly.

17. The guardrail post according to claim 11, further comprising a third fastener, wherein the post body is provided with at least two first convex lugs, each first convex lug defines a first positioning hole, the first sleeve is provided with at least two second convex lugs, each second convex lug defines a second positioning hole, the third fastener extends through the first positioning hole and the second positioning hole.

18. The guardrail post according to claim 11, wherein the post body defines a fixing hole at a bottom thereof, the guardrail post further comprise a fastener extending inside the fixing hole, to secure the post body to an external object.

19. The guardrail post according to claim 11, wherein the post body is further provided with a connection claw or glass clamp which is configured to clamp and support glass.

20. The guardrail post according to claim 11, wherein the first fastener is a pin.

* * * * *